May 25, 1965

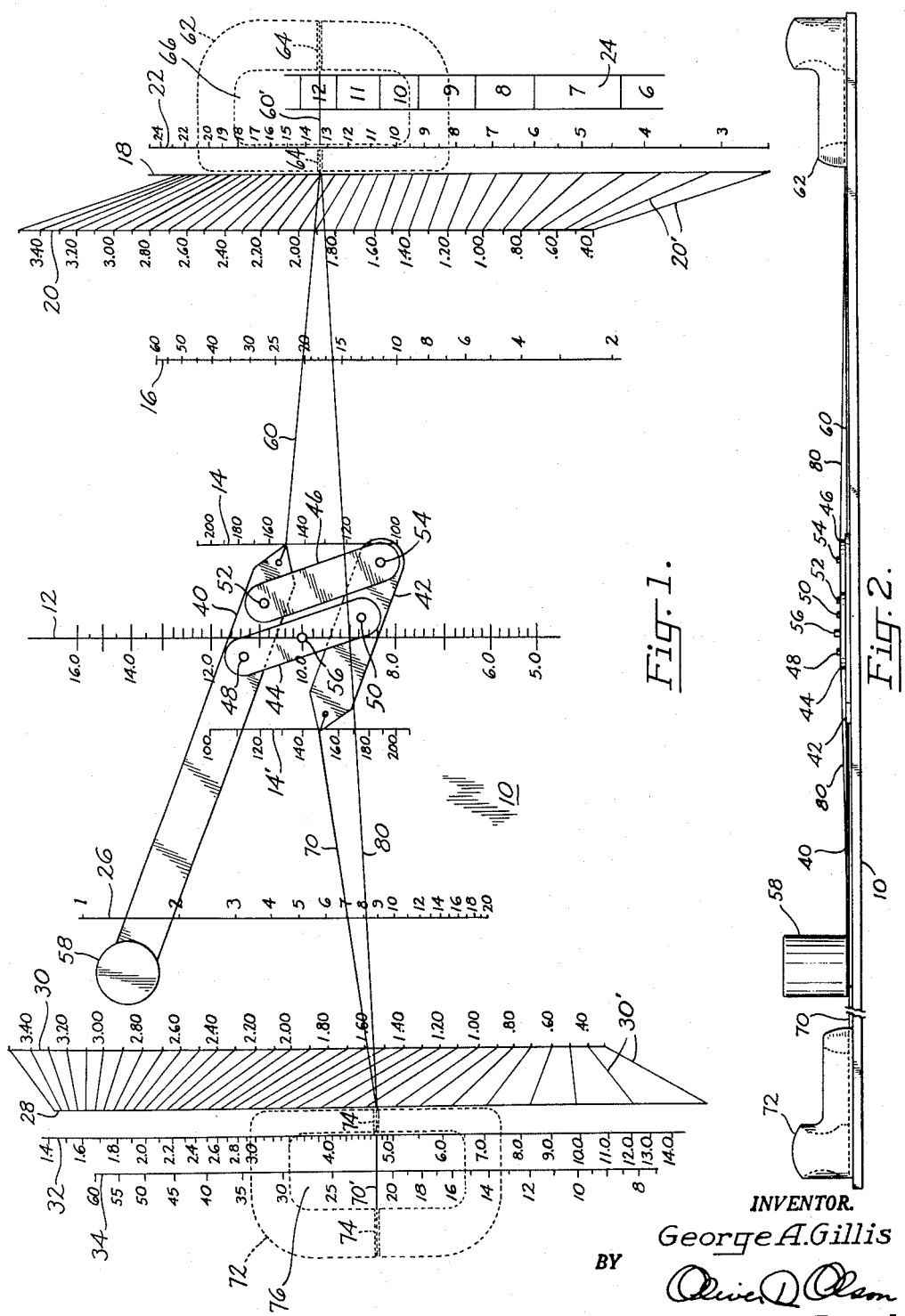

G. A. GILLIS 3,185,391

DEVICE FOR CALCULATING THE READABILITY
OF WRITTEN MATERIAL

Filed Dec. 11, 1962

INVENTOR.
George A. Gillis
BY
Oliver D. Olson
Agent

United States Patent Office 3,185,391
Patented May 25, 1965

3,185,391
DEVICE FOR CALCULATING THE READABILITY OF WRITTEN MATERIAL
George A. Gillis, Rte. 1, Box 179, Silverton, Oreg.
Filed Dec. 11, 1962, Ser. No. 243,771
5 Claims. (Cl. 235—61)

This invention relates to the determination of readability of study materials, and more particularly to a device by which to achieve such determinations with accuracy, speed and facility.

It is recognized among educators that a student needs continual growth in the ability to study independently. It is also recognized that this ability for independent study is closely related to the student's ability to read. On the other hand, reading abilities often are complicated by wide variations in readability of the study materials provided for the student. For example, a single high school text book may vary in reading level from fifth grade to college graduate level. Another text book may be characterized by consistently low reading level, and another by excessively high reading level. Thus, a student having a high reading level and supplied study material of low readability level loses interest and becomes bored with the unchallenging material. Conversely when study material of high readability level is supplied to students of low reading level, the result is confusion and frustration. In both instances the student becomes discouraged and thus fails to grow in his ability for independent study.

Many attempts have been made heretofore to develop methods by which to determine the readability of study materials, with the objective of providing the student with study material which is challenging but not frustrating. Of these the Dale-Chall formula for predicting readability has experienced increasing popularity. This formula is described in "The Dale-Chall Formula For Predicting Readability," by Dr. Edgar Dale and Dr. Jeanne S. Chall, published by the Division of Special Education, Oregon State Department of Education. This formula, as with others, is based upon the relationship of sentence length and unfamiliar words with the readability of written material. However, the mathematical computations involved in this formula renders the method quite time consuming, thus discouraging many educators and others who, although directly involved with the problem, cannot devote the time necessary for its effective use.

Accordingly, it is the principal object of the present invention to provide a device by which to facilitate and expedite the execution of methods such as the Dale-Chall formula to provide readability calculations with speed and facility.

Another important object of this invention is the provision of a device of the class described which affords additional interpretations of readability factors to supplement those provided by the Dale-Chall formula.

A further important object of the present invention is to provide a device of the class described which is of simplified construction for economical manufacture, which is manipulated with speed and facility, and is capable of extended use with minimum maintenance and repair.

The foregoing and other objects and advantages of this invention will appear from the following detailed description, taken in connection with the accompanying drawings in which:

FIG. 1 is a plan view of a readability calculating device embodying the features of the present invention;

FIG. 2 is a foreshortened view in side elevation as viewed from the bottom in FIG. 1.

Figure 3:
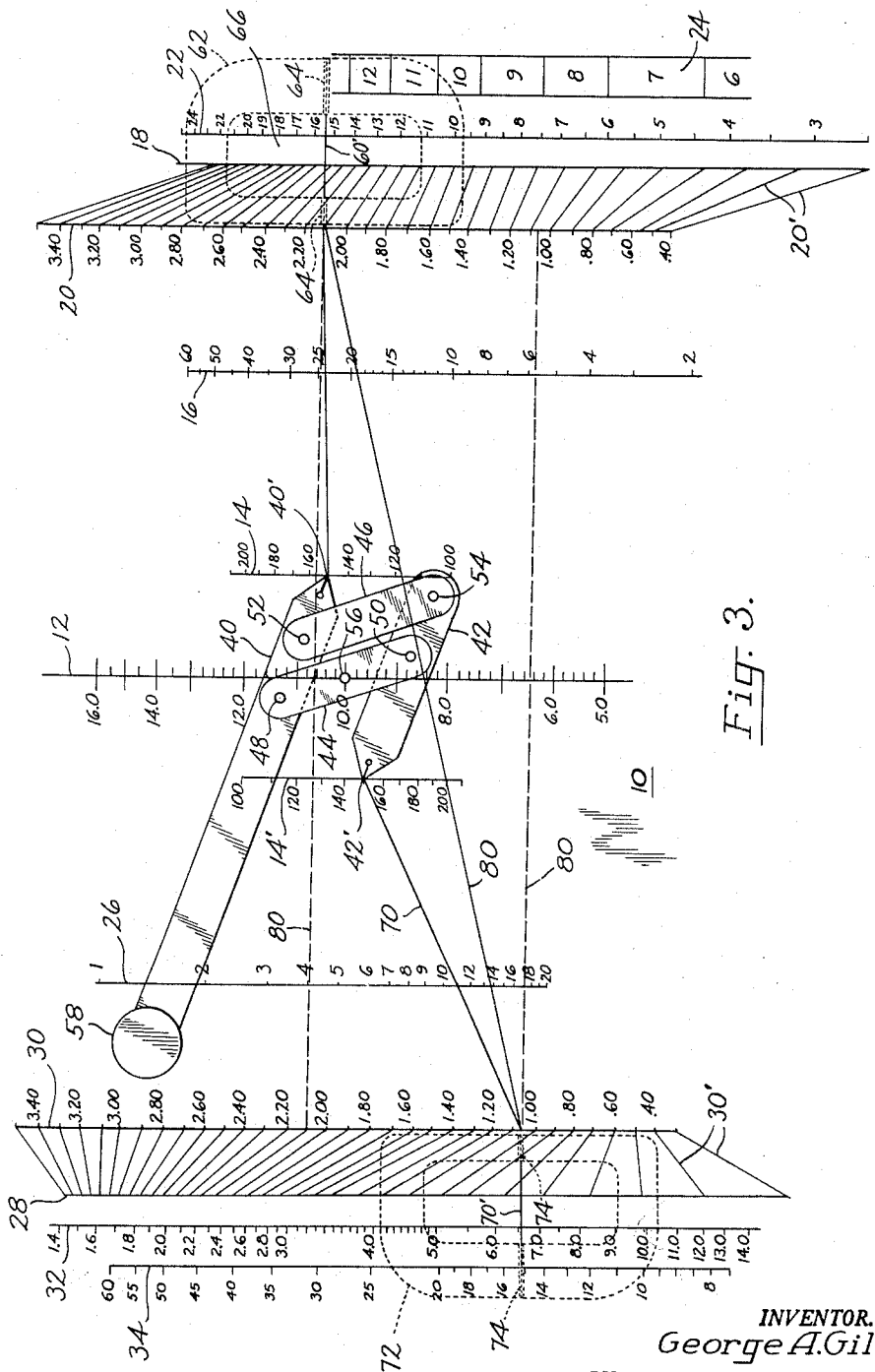
FIG. 3 is a plan view of the device illustrated in FIG. 1 with components thereof arranged in different positions of adjustment.

Referring particularly to FIG. 1 of the drawings, the device in the embodiment illustrated includes a flat rectangular base 10 of wood, plastic or metal. Carried upon the top surface of the base, either by imprinting directly thereon or by imprinting upon a cover sheet bonded thereto, are a plurality of graduated scales spaced apart laterally with respect to each other and arranged for mutual cooperation in a manner now to be described.

A central scale 12 is graduated longitudinally as described hereinafter and appropriately numbered to indicate the predicted readability grade level of a sample of study material. In the embodiment illustrated the device is adapted particularly for use in evaluating high school text books, and therefore the central scale is numbered to identify readability levels from grade five to grade sixteen.

Spaced symmetrically on opposite sides of the center scale are a pair of scales 14, 14' graduated logarithmically and numbered to designate the number of words in a selected sample of study material. As indicated, the numbering associated with these scales increase progressively in opposite directions, and it will be explained more fully hereinafter that one of these scales may be eliminated.

Spaced laterally outward from the word sample scale 14 is a scale 16 graduated logarithmically and numbered to indicate the number of strange words contained in the total sample of study material. The strange words are identified as those not appearing on a list of most commonly used words. Conveniently, this list is the Dale list of 3000 words compiled for use with the Dale-Chall formula, although other lists may be employed for other similarly based formulas.

Spaced outwardly from the scale 16 is a logarithmically graduated scale 18 which is associated with the uniformly graduated scale 20 by means of the conversion lines 20'. The numerical values shown associated with the scale 20 also relate to scale 18, and indicate the difficulty factor resulting from the presence in the sample of study material of various percentages of strange words. This strange word difficulty factor is devired by multiplying the constant 15.79 by the total number of strange words in the sample and then dividing by the total number of words in the sample. The conversion lines serve to transpose the numerical values at the logarithmic scale 18 to the uniformly graduated scale 20, for the purpose of subsequent addition, as explained more fully hereinafter.

Spaced outwardly from the scale 18 is a scale 22 graduated logarithmically and appropriately numbered to indicate the number of strange words per one hundred words of the selected sample of study material. Thus, this scale indicates the percentage of strange words in the sample.

An additional scale 24 also may be provided, laterally outward from the percentage scale 22, and graduated logarithmically as described hereinafter to identify areas appropriately numbered to indicate a student's tested reading level, for which student level a reading sample would have remedial value.

The markings for scale 24 are derived by projecting horizontal lines from scale 12 to scale 20, and thence along the oblique lines 20'. The areas are numbered one grade level higher than the corresponding marking on scale 12, thus providing measures of samples which are one year below the tested or frustrating level of the student.

Spaced outwardly from the other scale 14' of the pair of word sample scales is a scale 26 graduated logarithmically and appropriately numbered to indicate the number of sentences in the selected sample of study material.

Spaced outwardly from scale 26, and cooperating therewith, is a logarithmically graduated scale 28 which is associated with the uniformly graduated scale 30 by means of the conversion lines 30'. The numerical values shown associated with the scale 30 also relate to the scale 28 and indicate the difficulty factor resulting from variations in sentence length. This factor is derived by multiplying the constant 0.0496 by the number of words in the sample and then dividing by the number of sentences in the sample. Conversion of these factor values to the uniformly graduated scale 30 is for the purpose of subsequent addition, as described more fully hereinafter.

An additional scale 32, spaced outwardly from scale 28, is graduated logarithmically and numbered to indicate the number of sentences per one hundred words of the selected sample. This scale may be used in cooperation with scale 22 to provide an approximation of the average number of strange words per sentence of the sample. This same approximation may be derived by relating scales 16 and 26.

Also spaced outwardly from scale 28 is a scale 34 graduated logarithmically and numbered to indicate the average number of words per sentence in the sample.

The graduation of scale 12 is established by extending vertically spaced lines between values on scales 20 and 30. The numerical markings at these graduations are derived by adding the corresponding numerical values at scales 20 and 30 to the constant 3.6365 and then converting this raw score to grade level score by use of the correction table contained in the publication identified hereinbefore.

Means is provided by which the several scales may be associated one with another to derive various items of information which are pertinent in the analysis of a sample of study material. In the embodiment illustrated, a pair of elongated index pointers 40 and 42 are disposed with their longitudinal axes parallel, and are interconnected pivotally by a spaced pair of links 44 and 46, in the manner of a parallel ruler. Thus, the main link 44 is connected adjacent its opposite ends to the pointers by means of the pivot pins 48, 50 each of which is located on the longitudinal axis of the associated pointer and spaced the same distance from the index end 40', 42' of each pointer. The secondary link 46 similarly interconnects the pointers by means of the pivot pins 52, 54 which are located on the longitudinal axes of the respective pointers and spaced the same distance from the associated pins 48, 50.

A pivot pin 56 projects vertically from the base plate 10, with its axis in the vertical plane of the center scale 12. This pin is received in an opening located in the main link 44 midway between and on a line extending through the associated pivot pins 48, 50.

The index ends of the pointers face in opposite directions, and are arranged to register one with each of the pair of scales 14, 14'. One of the pointers, for example pointer 40, is extended in length and provided with a knob 58 for grasping by the fingers to facilitate manipulation of the parallelogram control assembly. The knob preferably is weighted for anchoring the pointer 40, and hence the entire control assembly, in desired positions of adjustment on the base plate 10.

The index end of pointer 40 serves as an anchor for one end of a thread 60, the opposite end of which is secured to a movable index block 62. The block rests freely upon the base plate 10 and is adapted for adjustment along the scales. In the embodiment illustrated, the thread is received freely in a groove 64 which extends transversely along the bottom side of the block. The end of the thread is secured to the block by any suitable means.

The central portion of the block is cut away to provide an elongated opening 66 through which to view a portion of the scales. The section of thread 60' which traverses this opening serves as a hairline index for association with the scales.

In similar manner, the index end of the other pointer 42 anchors one end of a thread 70, the opposite end of which is secured to an index block 72 having a groove 74, in manner similar to the block assembly previously described. A central opening 76 in the block 72 exposes the scales 32 and 34 for reading by the hairline index section 70' of thread 70.

The two index blocks are interconnected by a third thread 80 which also is confined at its opposite ends in the lateral grooves 64 and 74 provided in the associated blocks.

The threads preferably are made of elastic material to accommodate changes in length during manipulation of the blocks and parallelogram control assembly, so that the threads will remain tensioned. The threads serve as straight edges between the index points of their end anchors. Accordingly, the index blocks are made of relatively heavy material, such as iron, so as to retain their positions of adjustment against the tension of the elastic threads. The outer end of each index block is provided with a raised portion which functions as a knob for gripping with the fingers to facilitate manipulation of the blocks.

It is to be noted that the index ends of the pointers register one with each of the pair of scales 14, 14' and that during manipulation of the parallelogram assembly both index ends register with the same numerical graduations on the scale. Accordingly, it will be understood that one of the scales may be eliminated. Both scales are illustrated merely for clarity of understanding.

The operation of the device described hereinbefore now will be explained. Let it be assumed that the sample of study material selected for analysis contains seven sentences totaling one hundred fifty words, of which twenty are determined to be strange words (not found on the master list of most commonly used words). The pointer handle 58 is manipulated to bring the index end 40' into registry with the graduation on scale 14 designating one hundred fifty words. The parallelogram assembly functions automatically to bring the index end 42' of the other pointer 42 to the same graduation on the other scale 14'.

The index block 62 then is positioned with its straight edge aligned on the guide line of the scale 18, and the block is moved along the guide line until the thread 60 aligns with the graduation on scale 16 designating twenty strange words.

The straight edge of the left hand index block 72 now is aligned on the guide line of scale 28 and moved therealong until the thread 70 registers with the graduation on scale 26 indicating seven sentences. The elastic thread 80 may be pulled upward, if necessary, to stretch over the links 44, 46 of the parallelogram control assembly.

In the positions of adjustment now described, the following information concerning the sample of study material is obtainable: The study sample averages 21.2 words per sentence (scale 34), the sample averages 4.7 sentences per hundred words (scale 32), the sample averages 13.3 strange words per hundred words (scale 22), and the sample should have remedial reading value for a student whose reading ability tests at twelfth grade level (scale 24).

The right hand index block 62 now is moved inward (FIG. 3) to align its straight edge on the guide line of scale 20. In the present illustration this is accomplished by moving the index point on the block (where the thread 60 emerges from the straight edge) along the oblique line 20' with which it registers. As indicated in FIG. 3, the transferred position of the index point is at 2.10 on scale 20.

When the index point on the block lies between adjacent oblique lines 20' at scale 18, the transfer to scale 20 is made by positioning the index point on the scale 20 at the same proportionate spacing between adjacent oblique lines as was its position in relation to the adjacent lines on the scale 18.

In similar manner, the left hand index block 72 is moved inward to align its straight edge on the guide line of scale 30, using the adjacent oblique lines 30' to guide the index point to proper position. As indicated in FIG. 3, this position indicates the value of 1.06 on the scale.

With the index blocks thus adjusted to the scales 20 and 30, the predicted grade level of readability of the sample is indicated where the thread 80 crosses the scale 12, namely 8.5.

It is to be noted in the foregoing example that the difficulty factor of sentence length (1.06 on the scale 20) is about one-half the difficulty factor of strange words (2.10 on the scale 30). This indicates to the educator that the time to be spend with the students on vocabulary building before the lesson is read should be about twice the time spent for interpreting the study material after the lesson is read.

The significance of the relative magnitudes of the difficulty factors is brought out still more forcefully when they are considered from the standpoint of readability grade level. This is achieved as follows:

The right hand end of the thread 80 now is adjusted to the position of 1.06 on the scale 20. This adjustment is made either by moving the right hand indicator block 62 downward, or simply by drawing the elastic thread downward, using the eraser end of a pencil, a finger, or other suitable means. The thread 80 crosses the scale 12 at the graduation mark 6.5, thus indicating this grade level of readability of the sample with respect to sentence length.

With the right hand end of the thread 80 returned to the value of 2.10 on the scale 20, the left hand end of the thread now is moved upward to register with the value of 2.10 on the scale 30. The thread 80 now crosses the scale 12 at the value 10.6, indicating the grade level of readability of the sample with respect to the frequency of strange words. Thus, whereas the difficulty factor associated with sentence length indicates a readability level of grade 6.5, the difficulty factor associated with strange word frequency indicates a readability grade level of 10.6.

From the foregoing it will be apparent that the device of the present invention contributes materially to the practical use of the Dale-Chall formula by eliminating a multiplicity of mathematical computations and thereby reducing the time of execution of a given problem to but a small fraction of the time previously required. The device also provides additional items of information which are of value in the overall analysis of a sample of study material. The device is of extremely simplified construction and therefore its correspondingly low manufacturing cost makes it economically practicable for use at the class room level. The device is operable with speed and facility, thereby enabling the teacher to evaluate as many texts as are necessary to provide the proper study material for students of different reading grade levels. Since the time necessary to make such evaluations by means of the device of this invention is reduced to but a fraction of the time previously required, text book evaluation is made practicable for the past majority of teachers who otherwise could not devote the necessary time to it.

It will be apparent to those skilled in the art that various changes may be made in the structural details and arrangement of scales described hereinbefore. For example, the scales may be modified to accommodate other formulas and methods based upon the relationship of sentence length and strange words frequency with readability of written material. The scales 22, 24, 32 and 34 may be retained or omitted, and their positions may be transposed.

As stated hereinbefore, one of the scales 14, 14' may be omitted in view of the parallel ruler arrangement in which the index end of one pointer automatically establishes the same straight edge terminus as does the other index end of the other pointer. Accordingly, it is to be understood that the index end not associated with a visible scale effectively provides a scale for establishing the same terminus for the associated straight edge.

The longitudinally elastic threads may be replaced by rigid links pivotally interconnecting the index points and the anchor weights, by means of pins and associated elongated slots, to permit varying the spacing between the end anchors. The threads also may be replaced by light beams which provide straight edges.

The foregoing and other changes may be made without departing from the spirit of this invention and the scope of the appended claims.

Having now described my invention and the manner in which it may be used, what I claim as new and desire to secure by Letters Patent is:

1. A device for calculating the readability of written material, comprising
    (a) a base member having thereon a plurality of elongated, parallel, spaced scales,
    (b) the first scale being arranged centrally on the base member and graduated to indicate the predicted readability grade level of a sample of written material,
    (c) the second and third scales being disposed laterally outward on opposite sides of the first scale and graduated to indicate the number of words in the sample,
    (d) the fourth scale being disposed laterally outward from the second scale and graduated to indicate the number of strange words in the sample,
    (e) the fifth scale being disposed laterally outward from the fourth scale and graduated to indicate the strange word difficulty factor,
    (f) the sixth scale being disposed laterally outward from the third scale and graduated to indicate the number of sentences in the sample,
    (g) the seventh scale being disposed laterally outward from the sixth scale and graduated to indicate the sentence length difficulty factor,
    (h) first index means mounted movably on the base member and disposed for registry with the second scale,
    (i) second index means mounted movably on the base member and disposed for registry with the fifth scale,
    (j) first straight edge means interconnecting the first and second index means and registering with the fourth scale, the first straight edge means being operable upon registry with selected values on the second and fourth scales to identify the corresponding strange word difficulty factor on the fifth scale,
    (k) third index means mounted movably on the base member and disposed for registry with the third scale,
    (l) fourth index means mounted movably on the base member and disposed for registry with the seventh scale,
    (m) second straight edge means interconnecting the third and fourth index means and registering with the sixth scale, the second straight edge means being operable upon registry with selected values on the third and sixth scales to identify the corresponding sentence length difficulty factor on the seventh scale, and
    (n) third straight edge means interconnecting the second and fourth index means and registering with the first scale, the third straight edge means being operable upon registry with selected values on the fifth and seventh scales to identify the corresponding predicted readability grade level on the first scale.

2. The device of claim 1 wherein the first and third index means comprise parallel ruler means mounted pivotally on the base member, the second and fourth index means comprise anchor blocks mounted on the base member for sliding adjustment relative to the associated scale, and the first, second and third straight edge means comprise longitudinally elastic threads.

3. The device of claim 1 wherein the base member has thereon eighth and ninth elongated scales adjacent and parallel to the fifth and seventh scales, respectively, the fifth and eighth scales and the seventh and ninth scales being interconnected by conversion lines, and the second and fourth index means being movable between said respective interconnected scales along said conversion lines, the second and fourth scales being graduated to correspond with graduations on the eighth scale and the third and sixth scales being graduated to correspond with graduations on the ninth scale.

4. The device of claim 3 wherein the second, third, fourth, sixth, eighth and ninth scales are logarithmic, the fifth and seventh scales are uniform, and the first scale is graduated to indicate converted values of the sums of selected values on the fifth and seventh scales.

5. A device for calculating the readability of written material, comprising
 (a) a base member having thereon a plurality of elongated, parallel, spaced scales,
 (b) the first scale being arranged centrally on the base member and graduated to indicate the predicted readability grade level of a sample of written material,
 (c) the second and third scales being disposed laterally outward on opposite sides of the first scale and graduated logarithmically to indicate the number of words in the sample,
 (d) the fourth scale being disposed laterally outward from the second scale and graduated logarithmically to indicate the number of strange words in the sample,
 (e) the fifth scale being disposed laterally outward from the fourth scale and graduated uniformly to indicate the strange word difficulty factor,
 (f) the sixth scale being disposed laterally outward from the third scale and graduated logarithmically to indicate the number of sentences in the sample,
 (g) the seventh scale being disposed laterally outward from the sixth scale and graduated uniformly to indicate the sentence length difficulty factor,
 (h) the eighth scale being disposed adjacent and parallel to the fifth scale and graduated logarithmically, the fifth and eighth scales being interconnected by conversion lines,
 (i) the ninth scale being disposed adjacent and parallel to the seventh scale and graduated logarithmically, the seventh and ninth scales being interconnected by conversion lines,
 (j) first index means mounted movably on the base member and disposed for registry with the second scale,
 (k) second index means mounted movably on the base member and disposed for registry selectively with the fifth and eighth scales,
 (l) first straight edge means interconnecting the first and second index means and registering with the fourth scale, the first straight edge means being operable upon registry with selected values on the second and fourth scales to identify the corresponding strange word difficulty factor on the fifth scale,
 (m) third index means mounted movably on the base member and disposed for registry with the third scale,
 (n) fourth index means mounted movably on the base member and disposed for registry selectively with the seventh and ninth scales,
 (o) second straight edge means interconnecting the third and fourth index means and registering with the sixth scale, the second straight edge means being operable upon registry with selected values on the third and sixth scales to identify the corresponding sentence length difficulty factor on the seventh scale, and
 (p) third straight edge means interconnecting the second and fourth index means and registering with the first scale, the third straight edge means being operable upon registry with selected values on the fifth and seventh scales to identify the corresponding predicted readability grade level on the first scale, the first scale being graduated to indicate converted values of the sums of selected values on the fifth and seventh scales.

References Cited by the Examiner

UNITED STATES PATENTS

| 1,615,509 | 1/27 | Grodendorst | 235—61 |
| 2,076,439 | 4/37 | Young | 235—61 |
| 2,296,799 | 9/42 | Rosin | 235—61 |
| 2,309,675 | 2/43 | Scholmann | 235—61 |
| 2,666,577 | 1/54 | Parker | 235—61 |

FOREIGN PATENTS

| 561,280 | 8/50 | Canada. |
| 404,561 | 10/24 | Germany. |
| 863,857 | 1/53 | Germany. |

OTHER REFERENCES

Lipka, Joseph: Graphical and Mechanical Computation, John Wiley and Sons, New York, 1918. Chapter 4, pages 68–76 relied upon, especially page 73.

LEYLAND M. MARTIN, *Primary Examiner.*

LEO SMILOW, *Examiner.*